Apr. 17, 1923.
E. W. KETTLITZ ET AL
1,452,427
AUTOMOBILE BUMPER
Filed July 20, 1922
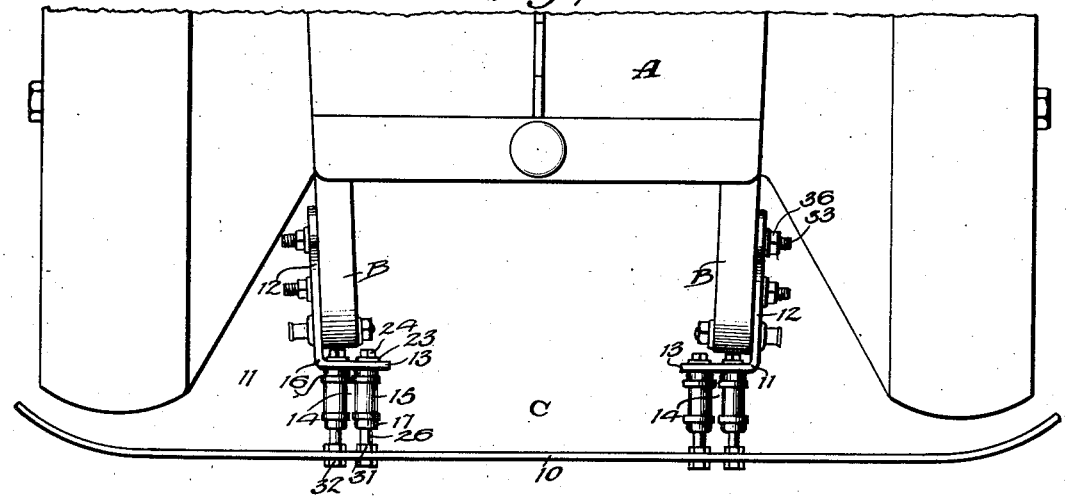
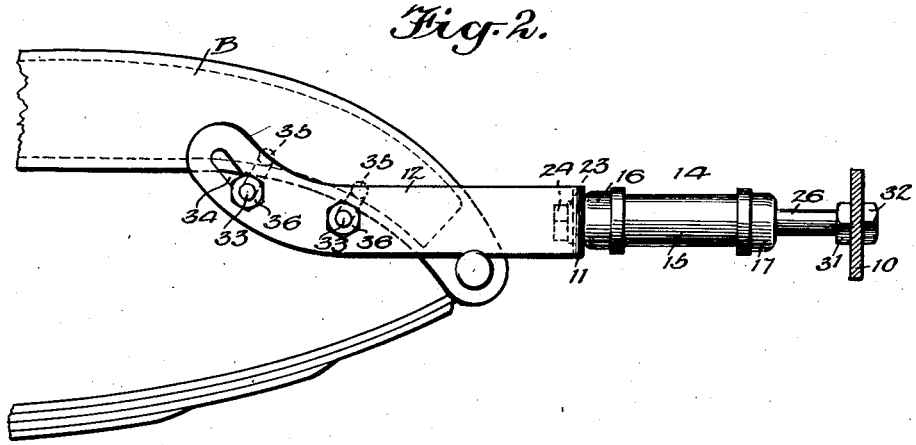
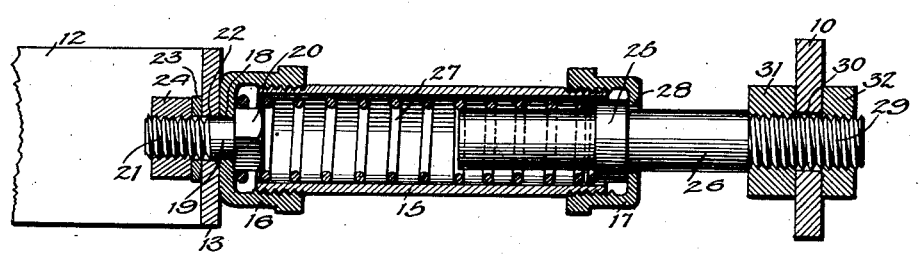
WITNESSES
INVENTORS
Edward W. Kettlitz
George Kuhn
BY
ATTORNEYS Patented Apr. 17, 1923.

1,452,427

UNITED STATES PATENT OFFICE.

EDWARD W. KETTLITZ, OF NEW YORK, AND GEORGE KUHN, OF ST. ALBANS, NEW YORK.

AUTOMOBILE BUMPER.

Application filed July 20, 1922. Serial No. 576,280.

*To all whom it may concern:*

Be it known that we, EDWARD W. KETTLITZ, a citizen of the United States, and a resident of the city of New York, borough of the Bronx, in the county of Bronx and State of New York, and GEORGE KUHN, a citizen of the United States, and a resident of St. Albans, borough of Queens, in the county of Queens and State of New York, have invented a new and Improved Automobile Bumper, of which the following is a full, clear, and exact description.

This invention has relation to shock absorbing devices and has particular reference to an improvement in bumpers for automobiles.

The invention aims for one of its principal objects to produce a bumper construction which contains a maximum of shock absorbing qualities and this without employing a device of unwieldy construction or unnecessary weight.

As a further object the invention contemplates a bumper construction utilizing in the main standard pipes and pipe fittings which render it inexpensive to manufacture and produce.

As a still further object the invention contemplates a simple and effective means for attaching the bumper to the chassis frame whereby the same may be readily applied thereto or removed therefrom without the aid of a skilled mechanic.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1 is a fragmentary plan view of an automobile with a bumper constructed in accordance with the invention associated therewith.

Fig. 2 is a detail enlarged side view thereof.

Fig. 3 is a fragmentary enlarged sectional view through one of the shock absorbing elements.

Referring to the drawing by characters of reference, A designates an automobile or motor vehicle and B the front ends of the chassis frame to which the bumper C constructed in accordance with the invention is attached. The bumper includes a crossbar 10 which preferably consists of a flat strip of material of the desired strength and configuration. A pair of angular brackets 11 are employed for attaching the bumper to the forward ends of the chassis frame B, said angular brackets consisting of rearwardly projecting substantially right angular terminals 13. A pair of shock absorbing elements 14 connect each terminal 13 with the crossbar 10 and support the crossbar from the brackets 11. As illustrated the shock absorbing elements are constructed from a length of standard pipe section 15 which is exteriorly threaded at its opposite ends to receive the caps 16 and 17, the former having a central aperture 18 through which a bolt 19 is passed with the head 20 disposed within the cap 16 and a threaded shank 21 projecting through the aperture 18 and a corresponding aperture 22 in the terminal 13. A washer 23 and nut 24 are then applied to the inner threaded shank 21 for holding the cap and pipe section in place. The pipe section 15 constitutes a cylinder or barrel within which the medial enlarged boss 25 of a shaft section 26 is snugly received to operate as a plunger, a coiled contractile spring 27 being interposed between the enlarged boss 25 and the inner cap 16. The outer cap 17 is centrally apertured as at 28 to snugly receive the shaft section 26 and allow for the axial movement of said shaft section therethrough. The outer end of the shaft section 26 is threaded as at 29 and said threaded end is passed through an aperture 30 in the crossbar 10 with retaining or binding nuts 31 and 32 threaded thereover and disposed at the inner and outer sides of the crossbar. Each pair of shock absorbing elements 14 are of similar construction and are disposed parallel to each other as clearly illustrated in Fig. 1. The particular mode of attaching the rearwardly projecting arm 12 with the brackets 11 to the forward ends of the chassis frame B consists in the employment of a pair of hook bolts 33 which are respectively passed transversely through a front aperture in the arm 12 and an inclined rear slot 34 in said arm. The hooked terminals 35 of the bolts engage and embrace the lower flange of the side rails of the chassis frame which are of channel iron construction. Nuts 36 are threaded to the opposite ends of the hook bolts to retain the brackets in place.

From the foregoing it will thus be seen that an extremely simple and inexpensive form of bumper has been produced which includes a maximum of shock absorbing qualities with a limited amount of movement of the bumper. The cost of production has been greatly reduced by employing standard pipe sections and pipe fittings. The parts are made removable and interchangeable whereby replacements when necessary may be accomplished readily at a low cost.

We claim:

1. A bumper for automobiles comprising a crossbar, a pair of attaching brackets having inwardly projecting forward ends, a pair of shock absorbing elements carried by the inwardly projecting ends of each bracket for connecting the crossbar to the vehicle and yieldably supporting the same therefrom.

2. A bumper for automobiles comprising a crossbar, a pair of attaching brackets secured to the vehicle and having inwardly projecting forward ends, a pair of shock absorbing elements carried by the said inwardly projecting ends of the brackets, each element comprising a pair of telescopic members having a coiled contractile spring interposed therebetween to constitute means for connecting the crossbar to the vehicle and for yieldably supporting the same therefrom.

3. A bumper for automobiles including angular brackets each consisting of a rearwardly projecting terminal attached to the ends of the chassis frame and inwardly projecting outer terminals, a pair of forwardly projecting cylinders from each of said terminals, plungers telescopically mounted in each cylinder, a coiled contractile spring within each cylinder for normally projecting the plungers therefrom, and a crossbar secured to the outer free ends of the plungers.

EDWARD W. KETTLITZ.
GEORGE KUHN.